United States Patent
Shimatsu

(10) Patent No.: US 7,395,700 B2
(45) Date of Patent: Jul. 8, 2008

(54) INTAKE DEVICE FOR INTERNAL COMBUSTION ENGINE AND METHOD OF MEASURING INTAKE AIR AMOUNT

(75) Inventor: Takayuki Shimatsu, Kawachi-gun (JP)

(73) Assignee: Keihin Corporation, Shinjuku-Ku, Tokyo (JP)

( * ) Notice: Subject to any disclaimer, the term of this patent is extended or adjusted under 35 U.S.C. 154(b) by 6 days.

(21) Appl. No.: 10/573,067

(22) PCT Filed: Sep. 15, 2004

(86) PCT No.: PCT/JP2004/013866

§ 371 (c)(1),
(2), (4) Date: Mar. 23, 2006

(87) PCT Pub. No.: WO2005/038222

PCT Pub. Date: Apr. 28, 2005

(65) Prior Publication Data

US 2007/0101807 A1    May 10, 2007

(30) Foreign Application Priority Data

Sep. 26, 2003    (JP)    ............... 2003-335784

(51) Int. Cl.
*G01M 15/00*    (2006.01)
(52) U.S. Cl. ...................... 73/118.2; 73/202
(58) Field of Classification Search ............ 73/118.2, 73/202, 202.5, 203, 116, 117.2, 117.3, 118.1, 73/861
See application file for complete search history.

(56) References Cited

U.S. PATENT DOCUMENTS

| 5,925,820 | A | 7/1999 | Tank et al. |
| 6,915,688 | B2* | 7/2005 | Kato et al. ............... 73/202.5 |
| 7,178,388 | B2* | 2/2007 | Okuda et al. ............ 73/118.2 |
| 2003/0046996 | A1* | 3/2003 | Nakada et al. ........... 73/202.5 |
| 2003/0159501 | A1* | 8/2003 | Renninger et al. ........ 73/118.2 |
| 2004/0003659 | A1* | 1/2004 | Kato et al. ................ 73/202 |
| 2006/0016254 | A1* | 1/2006 | Okuda et al. ............ 73/118.2 |

FOREIGN PATENT DOCUMENTS

| JP | 59-188037 A | 10/1984 |
| JP | 4-15388 | 1/1992 |
| JP | 4-15388 | 3/1992 |
| JP | 11-501126 | 1/1999 |
| JP | 2003-161652 | 6/2003 |

OTHER PUBLICATIONS

People's Republic of China Office Action, Application No.: 2004800275437, Date of Notification: Sep. 28, 2007, pp. 1-5. English Translation of Office Action included: pp. 1-8.

* cited by examiner

*Primary Examiner*—Eric S. McCall
(74) *Attorney, Agent, or Firm*—Squire, Sanders & Dempsey, LLP

(57) ABSTRACT

An intake device for an internal combustion engine includes a restriction valve provided in an air intake path of the engine, and an air flow rate sensor for measuring the amount of air suctioned into the air intake path which is provided on the downstream side of the restriction valve. The air flow rate sensor includes an air flow path where a sensor element is provided. The air flow sensor is set in the air intake path with a predetermined angle between the axis of the air flow path and the axis of the air intake path.

6 Claims, 2 Drawing Sheets

INTAKE DEVICE FOR INTERNAL COMBUSTION ENGINE AND METHOD OF MEASURING INTAKE AIR AMOUNT

TECHNICAL FIELD

The present invention relates to an intake device for an internal combustion engine and a method of measuring the intake air amount.

The present application claims priority on Japanese Patent Application No. 2003-335784 filed on Sep. 26, 2003, and the description thereof is cited herein by reference.

BACKGROUND ART OF THE INVENTION

In an internal combustion engine used for vehicles, there are some types in which a throttle valve (restriction valve) is provided on the upstream side of an air intake manifold (air intake path), and a fuel injection valve and an air flow rate sensor are provided on the upstream side thereof or on the downstream side thereof (For example, refer to Japanese Published Examined Patent Application, Second Publication No. H04-15388 (Page 2, FIG. 1))

The air flow rate sensor detects the amount of intake air and outputs an intake air rate signal. In a case where the sensor is provided on the downstream side of the throttle valve, generally, it is installed in the axis direction of an air intake path of the air intake manifold.

The intake air rate signal outputted by the air flow rate sensor is inputted into a control circuit, and a fuel injection amount is calculated in response to the running state of the engine. A fuel injection amount signal based on the calculated fuel injection amount is outputted from the control circuit, and the operation control of the fuel injection valve is performed.

In an air intake device of a conventional art internal combustion engine, the air flow rate sensor is an air flow meter that detects the amount of air as a mass flow amount. In a case where the air flow meter is installed on the upstream side of a throttle valve, since the air flow meter measures the total of an amount of air suctioned into a combustion chamber and an amount of air filled in an air intake manifold, there is a problem in that the amount of air suctioned into the combustion chamber cannot be accurately measured in the period of transition.

On the other hand, in a case where the air flow meter is installed on the downstream side of the throttle valve in the axis direction of an air intake path, it is not possible to accurately measure the amount of intake air due to disturbance of air, which occurs on the downstream side of the throttle valve. That is, one end of the throttle valve is inclined in the forward direction in regard to the streams of air by rotation of the throttle valve, and simultaneously, the other end of the throttle valve is inclined in the reverse direction of the streams of air. In a case where the throttle valve is slightly opened, since a gap is formed between the throttle valve in the air intake path and the air intake path, air is caused to flow to the downstream side of the throttle valve along the inner wall in the air intake path through the gap.

Therefore, air straightly flows along the inner wall of the air intake path on the downstream side at one end side of the throttle valve inclined in the forward direction, and air flows while forming a vortex toward the center direction of the air intake path on the downstream side at the other end side of the throttle valve inclined in the reverse direction. That is, an air flow that is substantially parallel to the inclination of the throttle valve is formed from the other end side to one end side on the downstream side of the throttle valve. Therefore, if the air flow meter is installed immediately behind the throttle valve so as to extend in the axial direction of the air intake path, there is a problem in that the air flow meter cannot accurately measure the air amount suctioned into the combustion chamber.

Further, when the throttle valve is fully opened, although air flows in the air intake path, since an area in which the velocity of air becomes slow is brought about on the downstream side of the turning shaft of the throttle valve, there is a problem in that the air flow meter cannot accurately measure the amount of air suctioned into the combustion chamber if the air flow meter is installed immediately behind the throttle valve so as to extend in the axis direction of the air intake path.

In order to solve these problems, it is necessary that, in the prior arts, an air intake path is made larger to reduce disturbance of air, and the air flow meter is installed at a suitable position.

The present invention was developed in view of such situations, and it is therefore an object of the invention to provide an air intake device for an internal combustion engine and a method of measuring an intake air amount, which are able to accurately measure the air flow rate and are able to downsize the air intake path.

DISCLOSURE OF THE INVENTION

The present invention provides an air intake device for internal combustion engine including: a restriction valve provided in an air intake path of the internal combustion engine; and an air flow rate sensor, provided in the air intake path and disposed on the downstream side of the restriction valve, for measuring the flow amount of air suctioned into the air intake path; wherein the air flow rate sensor includes an air flow path and a sensor element disposed in the air flow path, and is disposed so that the axis of the air flow path is inclined with respect to the axis of the air intake path.

In the air intake device for internal combustion engine, when the restriction valve provided in the air intake path of the internal combustion engine is opened, the velocity of air flow becomes slow at a position immediately behind the restriction valve in the air intake path since the restriction valve itself becomes a hindrance. On the other hand, at a position which is not immediately behind the restriction valve in the air intake path, for example, at a position close to the inner wall of the air intake path, the velocity of air is made faster without any hindrance. Therefore, since the air flow rate sensor includes an air flow path and a sensor element disposed in the air flow path, and is disposed so that the axis of the air flow path is inclined with respect to the axis of the air intake path, it becomes possible to accurately read the air amount at positions where the velocity of air is fast.

In particular, when the restriction valve is opened from a position close to the inner wall of the air intake path, the air flow rate sensor is able to accurately read the air amount at a position, where the velocity of air is fast, not always dependent on the opening degree of the restriction valve at a position close to the inner wall of the air intake path.

In the air intake device for internal combustion engine according to the present invention, it is preferable that the restriction valve includes a turning shaft which is perpendicular to the axis of the air intake path and blade portions for opening and closing the air intake path which turns centering around the turning shaft; and the air flow rate sensor is disposed so that the axis of the air flow path is inclined substantially in the same direction of the blade portions in a state where the air intake path is opened by turning the blade portions.

In the air intake device for internal combustion engine according to the present invention, it is preferable that the angle of the axis of the air flow path to the axis of the air intake path is 0° or more but 60° or less.

In the air intake device for internal combustion engine, in a case where the air flow rate sensor is installed in the axis direction of the air intake path on the downstream side of the restriction valve, one end of the restriction valve is inclined in the forward direction with respect to the streams of air due to rotation of the restriction valve, and simultaneously, the other end thereof is inclined in the reverse direction with respect to the streams of air. At this time, when the restriction valve is slightly opened, since a gap is formed between the restriction valve in the air intake path and the air intake path, air is caused to flow to the downstream side of the restriction valve along the inner wall in the air intake path through the gap.

Accordingly, air straightly flows along the inner wall of the air intake path on the downstream side at one end side of the restriction valve inclined in the forward direction, and air flows while forming a vortex toward the center direction of the air intake path on the downstream side at the other end side of the restriction valve inclined in the reverse direction. That is, streams of air which are substantially parallel to the inclination of the restriction valve are formed from the other end side to the one end side of the restriction valve. Since the air flow rate sensor is disposed so that the axis of the air flow path is inclined substantially in the same direction as a blade portion, in a state where the air intake path is opened, by turning the blade portion, the air flow rate sensor receives streams of air, which are substantially parallel to the inclination of the restriction valve, almost on the front surface thereof and detects the air flow rate. Therefore, the measurement accuracy of an air intake amount, which is brought about by the air flow rate sensor, is improved.

The present invention also provides a method of measuring air intake amount of internal combustion engine, which employs air flow rate sensors including a sensor element and an air flow path having the sensor element disposed therein, which is disposed on the downstream side of a restriction valve in an air intake path of the internal combustion engine so that the axis of the air flow path is inclined with respect to the axis of the air intake path, and by which the amount of air suctioned into the air intake path is measured, wherein the air amount is measured based on the amount of air flow into the air flow path.

In the above-described method of measuring air intake amount of internal combustion engine, when the restriction valve provided in the air intake path of the internal combustion engine is opened, the restriction valve itself becomes a hindrance at a position immediately behind the restriction valve in the air intake path, wherein the air velocity becomes slow. On the other hand, the air flow becomes fast without any hindrance at a position which is not immediately behind the restriction valve in the air intake path, for example, at a position close to the inner wall of the air intake path. Therefore, since the air flow rate sensor is disposed with the axis of the air flow path inclined substantially in the same direction as the blade portion, in a state where the air intake valve is opened, by turning the blade portion, it becomes possible to read the velocity of air at a position where the air velocity is fast. In particular, when the restriction valve is opened from a position close to the inner wall of the air intake path, the air flow rate sensor becomes able to read the air velocity at a position, where the air velocity is fast, not always dependent on the opening degree of the restriction valve at a position close to the inner wall of the air intake path.

According to the present invention, it becomes possible to read the flow amount of air at a position where the air velocity is fast, and in particular, when the restriction valve is opened from a position close to the inner wall of the air intake path, and since the air flow rate sensor is able to read the flow amount of air at a position where the air velocity is fast, not always dependent on the opening degree of the restriction valve, at a position close to the inner wall of the air intake path, it is possible to accurately measure the flow rate of air. In addition, by accurately measuring the flow rate of air, since it is not necessary to make the air intake path larger to reduce the disturbance of air, downsizing of the air intake path can be achieved.

BEST MODE FOR CARRYING OUT THE INVENTION

Figure 1:
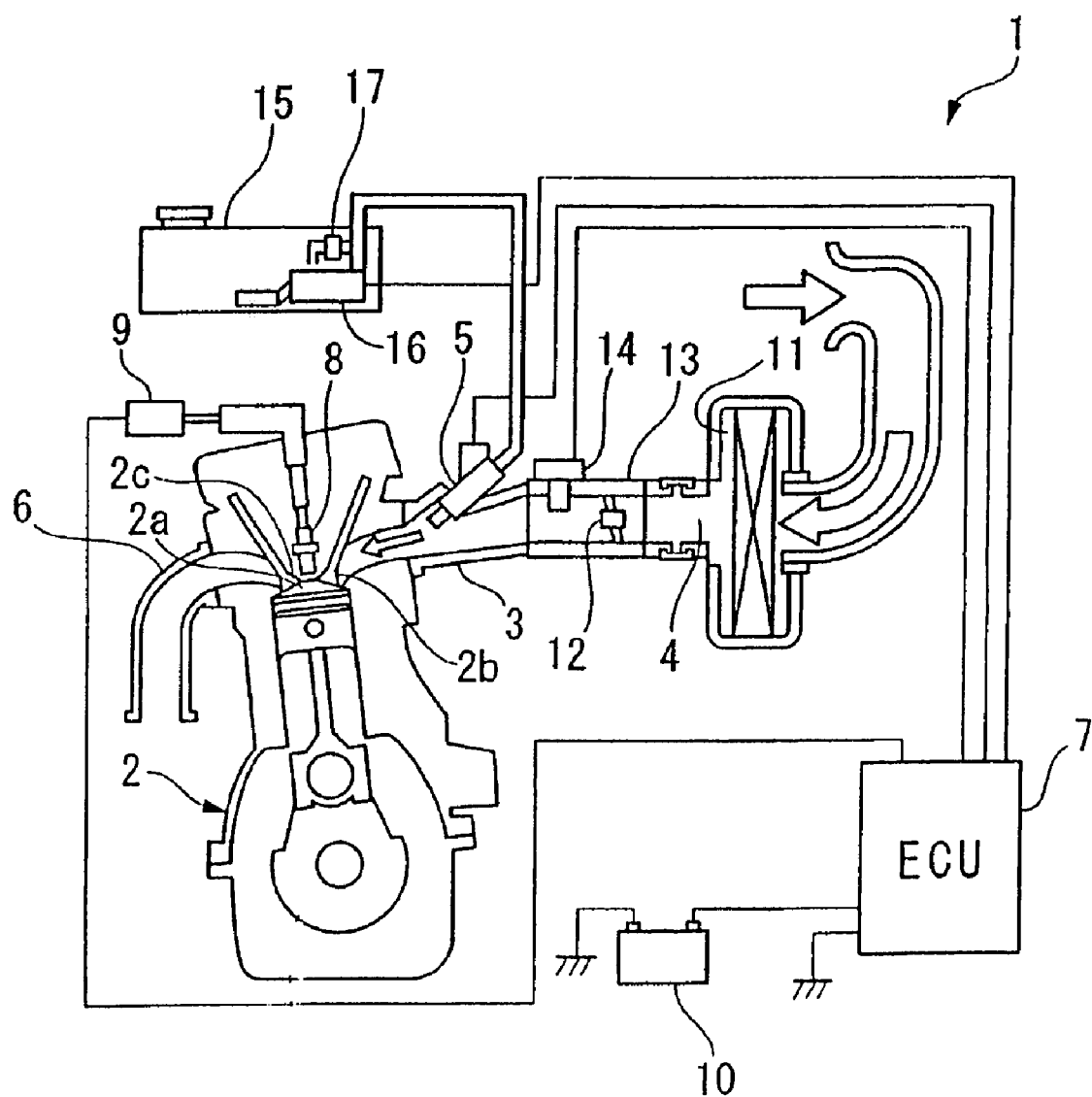
FIG. 1 is a schematic view of an engine control system including an air intake device in an embodiment according to the present invention.

Hereinafter, referring to the drawings, a description is given of a preferred embodiment of the present invention. FIG. 1 is a schematic view showing an engine control system equipped with a control device of an internal combustion engine according to the embodiment.

In an engine control system 1 according to the embodiment shown in FIG. 1, when air is suctioned in from an air intake path 4 coupled to an air intake manifold 3 of an engine 2 which is an internal combustion engine, the air and fuel injected from an injector 5 disposed in the air intake manifold 3 are mixed, the mixed gas is fired in a combustion chamber 2a of the engine 2, an after-combustion gas is exhausted from an exhaust manifold 6, a control device 7 of the internal combustion engine controls the injection amount and the injection timing of injection fuel in response to an air amount (air intake amount) suctioned into the engine 2.

The air intake path 4 is provided with an air cleaner 11 and a throttle body 13 having a throttle valve 12 being a restriction valve for regulating the air amount at the downstream side of the air cleaner 11.

The amount of air suctioned into the engine 2 through the air intake path 4 is detected in terms of a mass flow rate by an air flow meter (air flow rate sensor) 14 which is a sensor disposed so as to be positioned at the downstream side of the throttle valve 12. Since the air flow meter 14 is positioned at the downstream side of the throttle valve 12, it is possible to accurately detect the amount of air, actually suctioned into the combustion chamber 2a of the engine 2, of the air passed through the air cleaner 11. In addition, if the air flow meter 14 is attached to the throttle body 13, the number of setting steps can be reduced.

Figure 2:
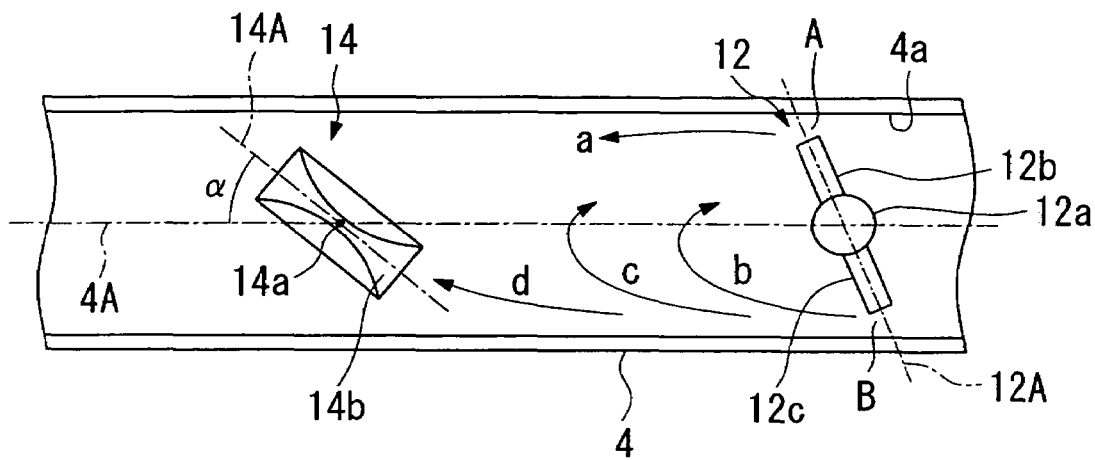
FIG. 2 is a partially enlarged view showing a throttle valve and an air flow meter.

FIG. 2 is a partially enlarged view depicting the throttle valve 12 provided in the air intake path 4 and the air flow meter 14. Also, the air intake device of an internal combustion engine is included of the air intake path 4, the throttle valve 12 provided in the air intake path 4, and the air flow meter 14 provided in the air intake path 4.

The throttle valve 12 is provided with a turning shaft 12a which is perpendicular to the axis and located on the axis of the air intake path 4, and blade portions 12b and 12c rotating centering around the turning shaft 12a. The blade portions 12b and 12c are disposed so as to form the same plane at both sides of the turning shaft 12a.

The air flow meter 14 has a structure in which a sensor element 14a is provided at the middle part of an air flow path 14b. The air flow meter 14 is installed in the air intake path 4 so that the center axis which is in the direction perpendicular to the paper surface in FIG. 2 and is parallel to the turning shaft 12a of the throttle valve 12 is located on an axis 4A of the air intake path 4 and an axis 14A being in the lengthwise direction of the air flow path 14b which is perpendicular to the center axis forms an angle α with respect to the axis 4A of the air intake path 4.

The air flow meter 14 is disposed so that the axis 14A of the air flow path 14b is inclined substantially in the same direction as the blade portions 12b and 12c in a state where the air intake path 4 is opened by turning the blade portions 12b and 12c of the throttle valve 12.

As a preferable air flow meter 14 suitable for the embodiment, such a sensor may be listed, in which a platinum thin membrane is deposited on a silicon substrate as the sensor element 14a and a current is permitted to flow so that the temperature of the platinum thin membrane is kept constant. When the mass of air circulating in the periphery of the platinum thin membrane, that is, in the air flow path 14b shown in FIG. 2 is increased, the heat calories dissipating from the platinum thin membrane via air are increased, wherein the temperature of the platinum thin membrane is lowered in proportion thereto. At this time, the air flow meter 14 increases a current flowing into the platinum thin membrane so as to keep the temperature constant. On the other hand, as the mass of air circulating around the periphery of the platinum thin membrane decreases, the heat calories dissipating from the platinum thin membrane via air are reduced and the temperature of the platinum thin membrane is raised, thereby the air flow meter 14 decreases a current flowing into the platinum thin membrane. Thus, since the current amount is increased and decreased in proportion to an increase and a decrease in the mass of air circulating around the periphery of the platinum thin membrane, it is possible to measure the air amount by monitoring the current amount.

Further, since such an air flow meter 14 can further reduce the heat capacity in comparison with a case where a platinum-made wire is used, higher response and higher measurement accuracy can be achieved.

The injector 5 injects fuel into air circulating in the air intake manifold 3 by opening and closing operations of an electronic injection valve, and fuel pumped out by a fuel pump 16 provided in a fuel tank 15, whose pressure is regulated by a regulator 17, is supplied into the injector 5.

Supply of mixed gases into the combustion chamber 2a and exhaust after firing are carried out by an intake valve 2b and an exhaust valve 2c, which are driven by a valve timing mechanism (not illustrated).

The mixed gases are ignited by an ignition plug 8. The ignition plug 8 is caused to discharge by utilizing high energy accumulated in an ignition circuit 9.

The control device 7 in charge of controlling in the engine control system 1 is a so-called ECU (Electronic Control Unit), which includes a CPU (Central Processing Unit), a ROM (Read-Only-Memory), etc., and operates by receiving a power supply from a battery 10. The control device 7 carries out predetermined processes, using an output current of the air flow meter 14 as input data, and determines the amount of fuel supplied from the fuel pump 16 to the injector 5, an injection amount of the injector 5 and its injection timing, charge commencement timing to the ignition circuit 9, and its ignition timing, and further outputs instruction signals to the respective parts.

Next, a description is given of functions of the air intake device of internal combustion engine composed as described above, and a method of measuring air intake amount.

As the engine 2 starts, air intake into the engine 2 is commenced after a specified period of time elapses, air is suctioned into the air intake path 4 of the engine 2, and the air passes through the throttle valve 12 in the air intake path 4 and flows into the air flow meter 14 on the downstream side thereof.

When the throttle valve 12 provided in the air intake path 4 is slightly opened, the blade portions 12b and 12c are turned centering around the turning shaft 12a of the throttle valve 12, wherein the blade portion 12b is inclined in the forward direction with respect to the streams of air, and simultaneously the blade portion 12c is inclined in the reverse direction with respect to the streams of air, and intake of air into the engine 2 is commenced. At this time, since gaps A and B are brought about between the blade portions 12b and 12c in the air intake path 4 and an inner wall 4a of the air intake path 4, air is caused to flow to the downstream side of the throttle valve 12 along the inner wall 4a in the air intake path 14 through the gaps A and B. Also, air straightly flows along the inner wall 4a of the air intake path 4 at the blade portion 12b side of the throttle valve 12 (in the arrow a in FIG. 2), and further flows while forming a vortex in the center direction of the air intake path 4, that is, the direction of the turning shaft 12a at the blade portion 12c side of the throttle valve 12 (in the arrows b, c and d in FIG. 2). That is, air streams are formed along the throttle valve 12 from the blade portion 12c side toward the blade portion 12b side immediately behind the throttle valve 12.

At this time, air passing through the gap A between the blade portion 12b inclined in the forward direction with respect to the air streams and the inner wall 4a of the air intake path 4 passes through while being collected toward the gap A since the blade portion 12b is inclined in the forward direction with respect to the air streams. Therefore, the air velocity becomes fast, and the air pressure on the downstream side of the gap A is reduced. On the other hand, air passing through the gap B between the blade portion 12c inclined in the reverse direction with respect to the air streams and the inner wall 4a of the air intake path 4 passes through, as it is, without being collected toward the gap B since the blade portion 12b is inclined in the reverse direction with respect to the air streams, wherein the air velocity does not become fast, and the air pressure on the downstream side of the gap B hardly decreases. For this reason, a remarkable lowering in pressure occurs on the downstream side of the gap A. Resultantly, air becomes easy to flow from the blade portion 12c to the blade portion 12b on the downstream side of the throttle valve 12.

Since the air flow meter 14 is installed on the downstream side of the throttle valve 12 in the air intake path 4, and the axis 14A of the air flow path 14b is disposed so as to be inclined substantially in the same direction as the blade portions 12b and 12c in a state where the air intake path 4 is opened by turning the blade portions 12b and 12c of the throttle valve 12, the air flow meter 14 receives air streams substantially from its front side with respect to the air streams formed along the throttle valve 12 from the blade portion 12c toward the blade portion 12b side, wherein it becomes possible to detect the air amount. Therefore, measurement accuracy of the air intake amount by the air flow meter 14 is improved.

Also, as air is suctioned into the engine 2 in a state where the throttle valve 12 provided in the air intake path 4 is fully opened, the air velocity becomes slow since the throttle valve 12 itself becomes a hindrance at a position immediately behind the throttle valve 12 in the air intake path 4. On the other hand, the air velocity becomes fast without being subjected to a hindrance due to air streams by the throttle valve 12 at a position along the inner wall 4a of the air intake path 4, which is not immediately behind the throttle valve 12 in the air intake path 4. Therefore, by the air flow meter 14 being disposed in the air intake path 4 so that the axis 14A in the lengthwise direction of the air flow meter 4 is inclined to the axis 4A of the air intake path 4, it becomes possible to accurately read the air amount at a position where the air velocity is fast. Further, at a position close to the inner wall 4a of the air intake path 4, it becomes possible for the air flow meter 4 to accurately read the air amount at a position where the air velocity is fast, not always dependent on the opening degree of the throttle valve 12.

Figure 3:
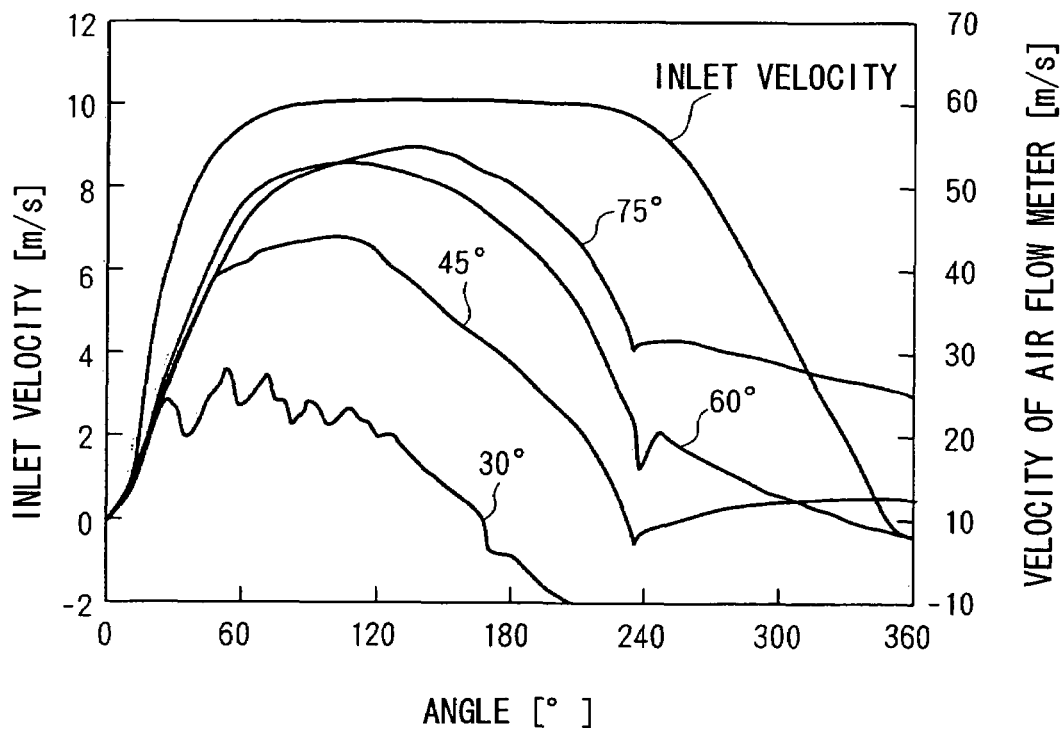
FIG. 3 is a graph comparing the velocity of air suctioned into a combustion chamber of an engine and the velocity of air calculated based on the intake air amount detected by the air flow meter.

FIG. 3 is a graph in which the velocity of air suctioned into the combustion chamber 2a of the engine 2 is compared with the velocity of air calculated on the basis of the air intake amount detected by the air flow meter 14.

Herein, FIG. 3 shows the relationship between a crank angle, the air velocity at the inlet of the air intake path 4 and the velocity of air passing through the air flow meter 14 where the angle α (that is, the installation angle of the air flow meter 14) formed by the axis 14A in the lengthwise direction of the air flow meter 14 with respect to the axis 4A of the air intake path 4 is made into 30°, 45°, 60°, and 75° in the clockwise direction. In addition, in FIG. 3, the abscissa indicates the crank angle (°), one ordinate indicates the velocity (m/s) of air at the inlet of the air intake path 4, and the other ordinate indicates the velocity (m/s) of air passing through the air flow meter 14.

In a case where the installation angle α of the air flow meter 14 is 30° or more, if the engine is in its intake stroke, there is no case where the velocity of air passing through the air flow meter 14 becomes negative. That is, if the installation angle α of the air flow meter 14 is set to 30° or more, there is almost no adverse influence due to reverse flows of air. Therefore, it is preferable that the installation angle α of the air flow meter 14 is 30° or more.

In a case where the installation angle α of the air flow meter 14 is 75°, when the crank angle is between 0° and 120°, the velocity of air passing through the air flow meter 14 is further lowered than in the case where the installation angle α of the air flow meter 14 is 60° or more. In a case where the installation angle α of the air flow meter 14 exceeds 75°, it can be presumed that the tendency further remarkably appears. Therefore, it is preferable that the installation angle α of the air flow meter 14 is 60° or less.

Further, when the throttle valve 12 is fully opened, the velocity of air flowing through the air intake path 4 does not greatly change even at a position close to the inner wall of the air intake path 4 or even at a position close to the center of the air intake path 4. That is, when the throttle valve 12 is fully opened, if the installation angle α of the air flow meter 14 is set to 60° or less, it becomes possible to sufficiently measure the velocity of air passing through the air flow meter 14.

Thus, by setting the installation angle α of the air flow meter to 30° or more but 60° or less, it becomes easy to obtain accurate waveforms.

According to the above-described construction, the air flow meter 14 becomes able to read the air amount at a position where the air velocity is fast. Furthermore, it becomes possible to accurately read the air amount at a position, where the air velocity is fast, not always dependent on the opening degree of the throttle valve 12 in a position close to the inner wall 4a of the air intake path 4. Accordingly, the flow amount of air can accurately be measured. In addition, by accurately measuring the flow amount of air, it is not necessary to make the air intake path 4 larger to reduce air disturbance, wherein downsizing of the air intake path 4 can be achieved.

Additionally, since it becomes possible to accurately measure the air flow amount, it becomes easy to calculate the number of times of revolutions of the engine 2 based on the number of waveforms, per unit time, of the air flow amount, and at the time, since it is possible to presume the status of the engine 2 such as the crank angle or the opening degree of the throttle valve, accurate fuel injection and accurate ignition timing control can be achieved by only the air flow meter.

As described above, although a preferred embodiment of the present invention is described, the present invention is not limited to the above-described embodiment. The present invention may be subjected to additions, omissions, substitutions and other modifications in the construction within the scope not departing from the spirit of the present invention. The present invention is not limited by the description, but is limited only by the scope of the claims added hereto.

INDUSTRIAL APPLICABILITY

The present invention relates to an air intake device of internal combustion engine that includes a restriction valve provided in an air intake path of the internal combustion engine; and an air flow rate sensor; provided in the air intake path and disposed on the downstream side of the restriction valve, for measuring the flow amount of air suctioned into the air intake path; wherein the air flow rate sensor includes an air flow path and a sensor element disposed in the air flow path, and is disposed so that the axis of the air flow path is inclined with respect to the axis of the air intake path.

The present invention also relates to a method of measuring air intake amount of internal combustion engine, which measures the amount of air suctioned into the air intake path, by using an air flow rate sensor which is provided in the air intake path of an internal combustion engine, disposed on the downstream side of the restriction valve, and provided with a sensor element and an air flow path in which the sensor element is disposed, wherein the air amount is measured in a state where the air flow rate sensor is disposed so that the axis of the air flow path forms a predetermined angle with respect to the axis of the air intake path.

According to the present invention, it becomes possible to read the flow amount of air at a position where the air velocity is fast. In particular, where the restriction valve is opened from a position close to the inner wall of the air intake path, it becomes possible for the air flow rate sensor to read the flow amount of air at a position where the air velocity is fast, not always dependent on the opening degree of the restriction valve at a position close to the inner wall of the air intake path. Therefore, it is possible to accurately measure the flow amount of air. Further, since the flow amount of air can be accurately measured, it is not necessary to make the air intake path larger to reduce air disturbance, wherein downsizing of the air intake path can be achieved.

The invention claimed is:

1. An air intake device of an internal combustion engine, comprising: a restriction valve provided in an air intake path of the internal combustion engine; and an air flow rate sensor, provided in the air intake path and disposed on the downstream side of the restriction valve, for measuring the flow amount of air suctioned into the air intake path; wherein
the air flow rate sensor comprises;
an air flow path which is formed linearly along the axis thereof and which is provided so that the axis thereof is inclined with respect to the axis of the air intake path; and
a sensor element provided in the air flow path and disposed on the axis of the air intake path.

2. The air intake device of an internal combustion engine according to claim 1, wherein
the air flow path of the air flow rate sensor is formed so that a middle part of the air flow path at which a sensor element of the air flow rate sensor is located is narrower than an inlet end and an outlet end of the air flow path.

3. The air intake device of an internal combustion engine according to claim 1, wherein
the air flow rate sensor is disposed so that a sensor element is located on an axis of the air intake path.

4. The air intake device of an internal combustion engine according to claim 1, wherein
the restriction valve comprises a turning shaft which is perpendicular to the axis of the air intake path and blade portions for opening and closing the air intake path which turns centering around the turning shaft; and
the air flow rate sensor is disposed so that the axis of the air flow path is inclined substantially in the same direction of the blade portions in a state where the air intake path is opened by turning the blade portions.

5. The air intake device-of an internal combustion engine according to claim 4, wherein
the angle of the axis of the air flow path with respect to the axis of the air intake path is 30$20$ or more but 60$20$ or less.

6. A method of measuring air intake amount of an internal combustion engine,
comprising:
suctioning air into an air intake path of the internal combustion engine; and
measuring the amount of the suctioned air into the air intake path by using an air flow rate sensor provided in the air intake path and disposed on the downstream side of a restriction valve wherein between;
the air flow rate sensor comprises:
an air flow path which is formed linearly along the axis thereof and which is provided so that the axis thereof is inclined with respect to the axis of the air intake path; and
a sensor element provided in the air flow path and disposed on the axis of the air intake path.

* * * * *